United States Patent [19]

Takahashi

[11] E Re. 29,360

[45] Reissued * Aug. 16, 1977

[54] SYSTEM FOR RECORDING AND/OR REPRODUCING FOUR CHANNEL SIGNALS ON A RECORD DISC

[75] Inventor: Nobuaki Takahashi, Yamato, Japan

[73] Assignee: Victor Company of Japan, Ltd., Yokohama, Japan

[ * ] Notice: The portion of the term of this patent subsequent to Aug. 22, 1989, has been disclaimed.

[21] Appl. No.: 720,762

[22] Filed: Sept. 7, 1976

Related U.S. Patent Documents

Reissue of:

[64] Patent No.: 3,883,699
Issued: May 13, 1975
Appl. No.: 261,914
Filed: June 12, 1972

U.S. Applications:

[63] Continuation of Ser. No. 92,803, Nov. 25, 1970, Pat. No. 3,686,471.

[30] Foreign Application Priority Data

| | | |
|---|---|---|
| Nov. 28, 1969 | Japan | 44-95587 |
| Mar. 15, 1970 | Japan | 45-21826 |
| Mar. 24, 1970 | Japan | 45-24579 |
| July 5, 1970 | Japan | 45-58313 |

[51] Int. Cl.[2] ..... G11B 3/00; G11B 3/74; H04B 5/00

[52] U.S. Cl. ..... 179/100.4 ST; 179/1 GQ; 179/15 BT; 179/100.1 TD; 179/100.4 M

[58] Field of Search ..... 179/100.4 ST, 100.4 M, 179/100.4 C, 100.1 TD, 100.1 S, 1 GQ, 15 BT

[56] References Cited

U.S. PATENT DOCUMENTS

| | | | |
|---|---|---|---|
| 2,281,405 | 4/1942 | Barrish et al. | 179/100.1 S |
| 2,349,886 | 5/1944 | Roberts | 179/100.4 M |
| 2,874,221 | 2/1959 | Dauguet | 179/15 BT |
| 3,067,292 | 12/1962 | Minter | 179/100.4 ST |
| 3,401,237 | 9/1968 | Takayanagi | 179/100.4 ST |

FOREIGN PATENT DOCUMENTS

| | | | |
|---|---|---|---|
| 1,196,711 | 7/1965 | Germany | 179/1 G |

OTHER PUBLICATIONS

Reference Data for Radio Engineers, 5th Ed., Modulation 21-11 thru 21-13, 1968 (supplied by applicant in parent case).

News for the Audiophile, Burstein, Radio Electronics, 4/58, pp. 38-39.

*Primary Examiner*—Raymond F. Cardillo, Jr.

[57] ABSTRACT

This system records four channel signals on or reproduces them from a record disc. The four channel signals are combined into sum signals and difference signals, respectively, each composed of two signals. Each difference signal is converted into an angle modulated wave by modulating a carrier from a single oscillator and is multiplexed with each sum signal. The four channel signals picked up from the record disc are reproduced and sounded respectively from four speakers placed at predetermined positions.

26 Claims, 21 Drawing Figures

SOUND SOURCE
10
ch.1
11
ch.2
12
ch.3
13
ch.4
14
TAPE RECORDER
15
ch.1
ch.2
ch.3
ch.4

TAPE RECORDER
15
ch.1
ch.2
ch.3
ch.4
MATRIX CKT
16
MATRIX CKT
17
EQUAL
18
EQUAL
19
EQUAL
20
EQUAL
21
ch.1 + ch.2
ch.1 - ch.2
ch.3 + ch.4
ch.3 - ch.4
FREQ MOD
22
FREQ MOD
23
LOCAL OSC
24
MIXER
25
MIXER
26
CUTTING AMP
27
CUTTING AMP
28
(ch1+ch2)+F(ch1 - ch2)
(ch3+ch4)+F(ch3-ch4)
29
30
31
45-45 CUTTER

RESPONSE
ch1+ch2
A
a
20dB
b
ch1-ch2
B
5
15
20
30
45
FREQ
(KHz)

RESPONSE
ch3+ch4
C
c
20dB
d
ch3-ch4
D
5
15
20
30
45
FREQ
(KHz)

33
32
34
45°
45°

69a
70a
71a
72a
69b
70b
71b
72b
AMP
65
66
67
68
ch.1
ch.2
ch.3
ch.4
MATRIX CKT
58
62
EQUAL
57
60
61
64
DEMOD
59
63
L.P.F.
53
B.P.F.
54
55
56
50
51
52
PICK UP
(ch.1+ch.2)+F(ch.1-ch.2)
(ch.3+ch.4)+F(ch.3-ch.4)
ch.1+ch.2
ch.1-ch.2
ch.3+ch.4
ch.3-ch.4
73
74
75
76
77
78
79
80
81
82
83

SYSTEM FOR RECORDING AND/OR REPRODUCING FOUR CHANNEL SIGNALS ON A RECORD DISC

Matter enclosed in heavy brackets [ ] appears in the original patent but forms no part of this reissue specification; matter printed in italics indicates the additions made by reissue.

This is a continuation of application Ser. No. 92,803, filed Nov. 25, 1970, now U.S. Pat. No. 3,686,471.

This invention relates to a system for recording four channel signals on and/or reproducing them from a record disc and, more particularly, to a system for recording four channel signals on a single groove of a record disc and/or reproducing these signals from this single groove.

In a conventional stereophonic record disc, two channels signals are recorded. In this stereo record, signals of the left and right channels are respectively recorded on two walls of a groove in the disc. This groove is called a 45—45 stereo system groove because both walls thereof are inclined at an angle of 45° with respect to a perpendicular line which passes through the deepest point of the groove. In this conventional two channels stereophonic system, there are two sound sources forming one sound plane, which enables this system to have a sound source reproductivity twice as large as that of a monaural system in which there is only one sound source and no sound plane whatsoever.

However, there has recently been an increasing demand for reproducing [and] a real atmosphere of the live performance in a reproduced sound field. It will be apparent that the degree of reality is enhanced if the number of signal sources can be increased. For this purpose, a proposed magnetic tape reproducing apparatus has sounds reproduced from a magnetic tape having four channel signals recorded on four tracks. However, it has heretofore been considered impossible to record four channel signals on a single groove of a record disc without providing a plurality of grooves for four channels.

This invention has made it possible to record four channel signals on a single groove of a record disc.

Even if a recording of four channel signals in a single groove of a record disc is made possible, a requirement for compatibility with the conventional two channel stereo record disc must be considered. More specifically, a stereophonic reproduction of a two channel record disc must be possible on a four channel record disc reproducing apparatus also, a stereophonic reproduction of a four channel record disc must be possible on a two channel record disc reproducing apparatus. Accordingly, a four channel record and a reproducing apparatus therefor which satisfy the aforementioned needs are required.

Further, in an amplitude modulation system, the signal-to-noise ratio cannot be improved in consideration of energy of side bands. In a frequency modulation system, the signal-to-noise ratio can be improved. If, however, there is a crosstalk between output signals from modulators having separate oscillators, a disturbing noise which did not exist originally will be produced. Therefore, a four channel record disc which can be of a practical use is not feasible unless the problem of disturbing noises caused by a crosstalk is satisfactorily settled.

Furthermore, in cutting and recording on an original lacquer disc, it is necessary to compress frequency bands of signals to be recorded due to limitation in operable frequency range of a cutting machine. This recording with the compressed bands must be effected without producing noises.

This invention has eliminated the barriers which heretofore have obstructed a realization of a four channel record and has satisfied every requirement as hereinabove described. It is, therefore, a general object of the present invention to provide a novel and useful system for recording and/or reproducing four channel signals on a record disc.

Another object of the invention is to provide a system for recording and reproducing four channel signals in a single groove of a record disc.

Yet another object of the invention is to provide a system for recording four channel signals on a record disc in such a way that no disturbing noise is produced by crosstalk which may occur between each channel signal.

A further object of the invention is to provide a system for reproducing four channel signals from a record disc, which system is compatible with the conventional system for playing back a two channel stereo record. A still further object of the invention is to provide an angle modulation type system for recording four channel signals on a record disc, in which four channel signals can be recorded without producing noise, even in the case where frequency bands of signals to be recorded are compressed in recording.

Other objects and features of the invention will become apparent from the description made hereinbelow with reference to the accompanying drawings, in which.

First, one embodiment of a recording system according to this invention will be described with reference to FIGS. 1 and 2.

Figures 1, 2:
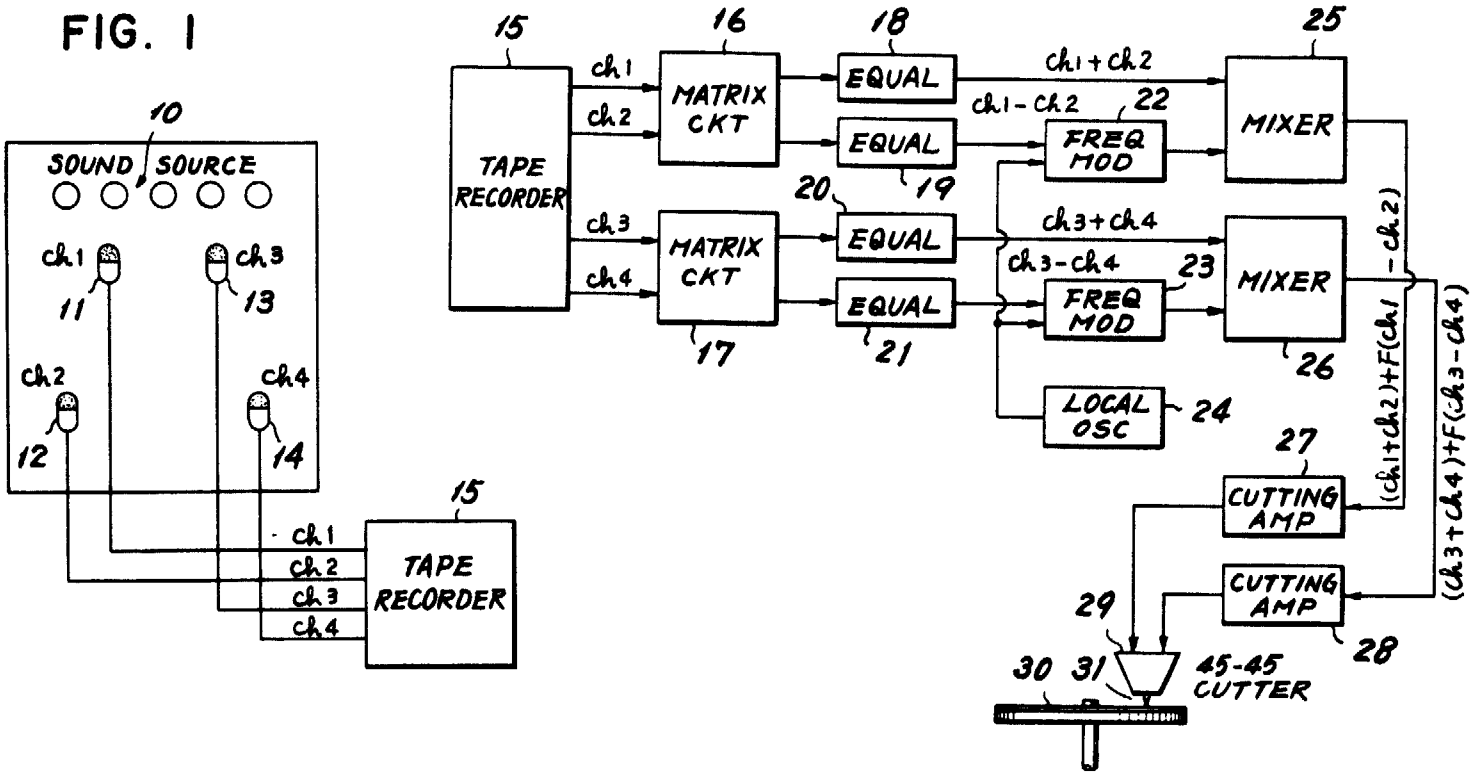
FIG. 1 is a schematic diagram showing a state in which sounds from sound sources are recorded as four channels signals on a magnetic tape.
FIG. 2 is a block diagram showing one embodiment of a recording system according to the invention for cutting and recording four channel signals on a record disc.

In FIG. 1, microphones 11 and 13 for the respective first and second channels are placed on the left and right, close to the sound sources 10. More remote from the sound sources 10, are microphones 12 and 14 on the left and right, for the respective third and fourth channels. The sounds from the sound sources 10 which are picked up by the microphones 11, 12, 13 and 14 are recorded as the first, second, third and fourth channel signals on four tracks of a magnetic tape provided in a cutting tape recorder 15. The frequency band of each channel signal is about 30Hz to 15KHz.

The magnetic tape on which recording has been effected is run in the tape recorder 15 at a speed of 1/S of the recording speed thereby reproducing the recorded four channel signals. In the present embodiment, the running speed of the tape during reproduction is about 1/2.7 of the recording speed. Accordingly, frequency bands of the first to fourth channel signals reproduced from the tape recorder 15 are compressed to 1/S (1/2.7 in the present embodiment) of the frequency bands of the recorded signals.

The first and second channel signals Ch1 and Ch2 respectively, having a frequency band of 15/S Khz, played back from the tape recorder 15 are supplied to a matrix circuit 16 and the third and fourth channel signals Ch3 and Ch4 to a matrix circuit 17. In the matrix circuit 16, the first and second channel signals Ch1 and Ch2 are converted into a sum signal (Ch1+Ch2) and a difference signal (Ch1−Ch2). The sum signal (Ch1+CH2) is supplied through an equalizer 18 to a mixer 25. The difference signal (Ch1−Ch2) is supplied through an equalizer 19 to a frequency modulator 22. At the frequency modulator 22, the difference signal (Ch1−Ch2) frequency modulates a carrier frequency generated by a single local oscillator 24. The frequency modulated difference signal F(Ch1−Ch2) is supplied to the mixer 25. This modulated difference signal is a signal which is frequency modulated with respect to input of the frequency modulator 22 and is phase modulated with respect to input of the equalizer 19. Accordingly, this modulated signal will hereafter be referred to as an angle modulated difference signal.

Figure 3A:
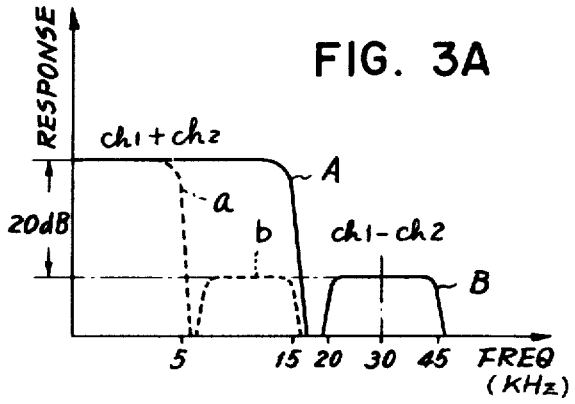
FIGS. 3A and 3B are graphs or diagrams showing respectively frequency characteristics of the recorded and reproduced signals.

The sum signal (Ch1+Ch2) supplied to the mixer 25 has a band which is shown by a broken line a in FIG. 3A. The angle modulated difference signal (Ch1−Ch2) supplied to the mixer 25 has a band shown by a broken line b in FIG. 3A. The frequency band b is higher than the upper frequency limit of the band a. Accordingly, the sum signal having the band a and the modulated difference signal having the band b are multiplexed together at the mixer 25 without overlapping each other.

Figure 3B:
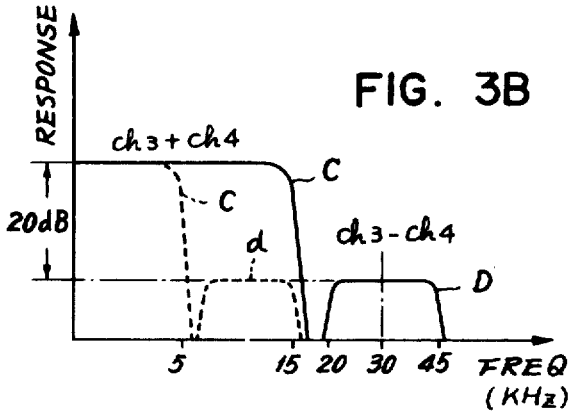

Similarly, the third and fourth channel signals Ch3 and Ch4 respectively, having a frequency band of 15/S KHz, are converted into a sum signal (Ch3+Ch4) and a difference signal (Ch3+Ch4) in the matrix circuit 17. The sum signal (Ch3+Ch4) is supplied through an equalizer 20 to a mixer 26. The difference signal (Ch3−Ch4) is supplied through an equalizer 21 to a frequency modulator 23. At the frequency modulator 23, the difference signal (Ch3−Ch4) frequency modulates a carrier frequency generated by the local oscillator 24, which carrier is the same as the one supplied to the modulator 22. This frequency modulated difference signal F(Ch3−Ch4) is supplied to the mixer 26. This modulated difference signal is referred to as an angle modulated difference signal. The sum signal (Ch3+Ch4) supplied to the mixer 26 has a band shown by a broken line c in FIG. 3B. The angle modulated difference signal F(Ch3−Ch4) supplied to the mixer 26 has a band shown by a broken line d in FIG. 3B. The frequency of band d is higher than the upper frequency limit of the band c. Accordingly, the sum signal having the band c and the modulated difference signal having the band d are multiplexed together at the mixer 26 without overlapping each other. The equalizers 18 and 20 may be, for example, of a normal type having RIAA characteristic.

The multiplexed signals {(Ch1+Ch2) + F(Ch1−Ch2)} and {(Ch3+Ch4) + F(CH3−Ch4)} from the mixers 25 and 26 are respectively amplified at cutting amplifiers 27 and 28. The amplified multiplexed signals are applied to a 45—45 system cutter 29. A lacquer disc 30, which is used for original disc recording, is rotated at a speed of 1/S of a normal rotating speed of a record disc (for example 33⅓ rpm). The signals applied to the cutter 29 are recorded by a cutting stylus 31 in a single spiral groove on the lacquer disc 30.

Figure 4:
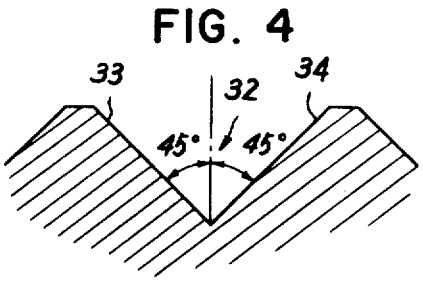
FIG. 4 is a vertical section of a groove of a record disc.

As in a conventional two channel stereo record disc, the cutting stylus 31 cuts, as shown in FIG. 4, a so-called 45—45 system groove 32 on the lacquer disc 30. The groove 32 has walls 33 and 34 respectively inclining at an angle of 45° with respect to a perpendicular passing through the deepest point of the groove 32. The multiplexed signal of the first and second channels {(Ch1+Ch2) + F(Ch1−Ch2)} is recorded on the left wall 33 (corresponding to a wall where a left channel signal of the conventional two channel stereo record is recorded) of the groove 32. This signal will hereafter be referred to as a L channel multiplexed signal. Similarly, the multiplexed signal of the third and fourth channels {(Ch3+Ch4) + F(Ch3−Ch4)} is recorded on the right wall 34 (corresponding to a wall where a right channel signal of the conventional two channel stereo record is recorded) of the groove 32. This signal will hereafter be referred to as a R channel multiplexed signal. Accordingly, the signals of four channels are simultaneously recorded in the single groove of the lacquer disc 30.

It is to be noted that the angle modulated difference signals F(CH1−Ch2) and F(Ch3−Ch4) should be maintained at a level of 1/10, i.e., −20 dB, of the direct wave sum signals (Ch1+Ch2) and (Ch3+Ch4).

A maximum operable frequency of the cutter 29 generally is about 17 KHz. According to this invention, each channel signal is compressed in its band as described hereinabove, whereby the maximum frequency of the angle modulated difference signals F(CH1−Ch2) and F(Ch3−Ch4) is limited to approximately 15 KHz. The cutter 29 is capable of recording those angle modulated signals.

As an alternative method to effect compression of the frequency bands employing [it will be] the tape recorder 15, [it will be] the first to fourth channel signals collected from the sound sources 10 are supplied directly to the matrix circuit circuits 16 and 17 and processed similar to that described hereinabove. The output signals from the mixers 25 and 26 ar recorded on a magnetic tape by means of the tape recorder. In this case, the magnetic tape is run at a speed, of 1/S of the recording speed and the reproduced multiplexed signals which are compressed in its frequency bands are recorded on the lacquer disc 30.

If, however, the difference signal is frequency modulated for the purpose of multiplexing with the sum signal before it is compressed in its band, the maximum frequency of the frequency modulated difference signal will reach as high as 45KHz. There are generally acicular crystals of magnetic material distributed at random on a magnetic surface of a magnetic tape. As a result, if, for example, an accurate sine wave is recorded on the magnetic tape, the waveform of the signal reproduced from the tape is different in each cycle, and a signal distortion is generated. Consequently, if this signal is frequency demodulated, a white noise is produced. It is, therefore, undesirable to effect recording and reproducing of the frequency modulated signal on the magnetic tape for band compression. It follows from this that the embodiment which has been described with reference to FIGS. 1 and 2 is a preferable embodiment.

Figures 5, 6:
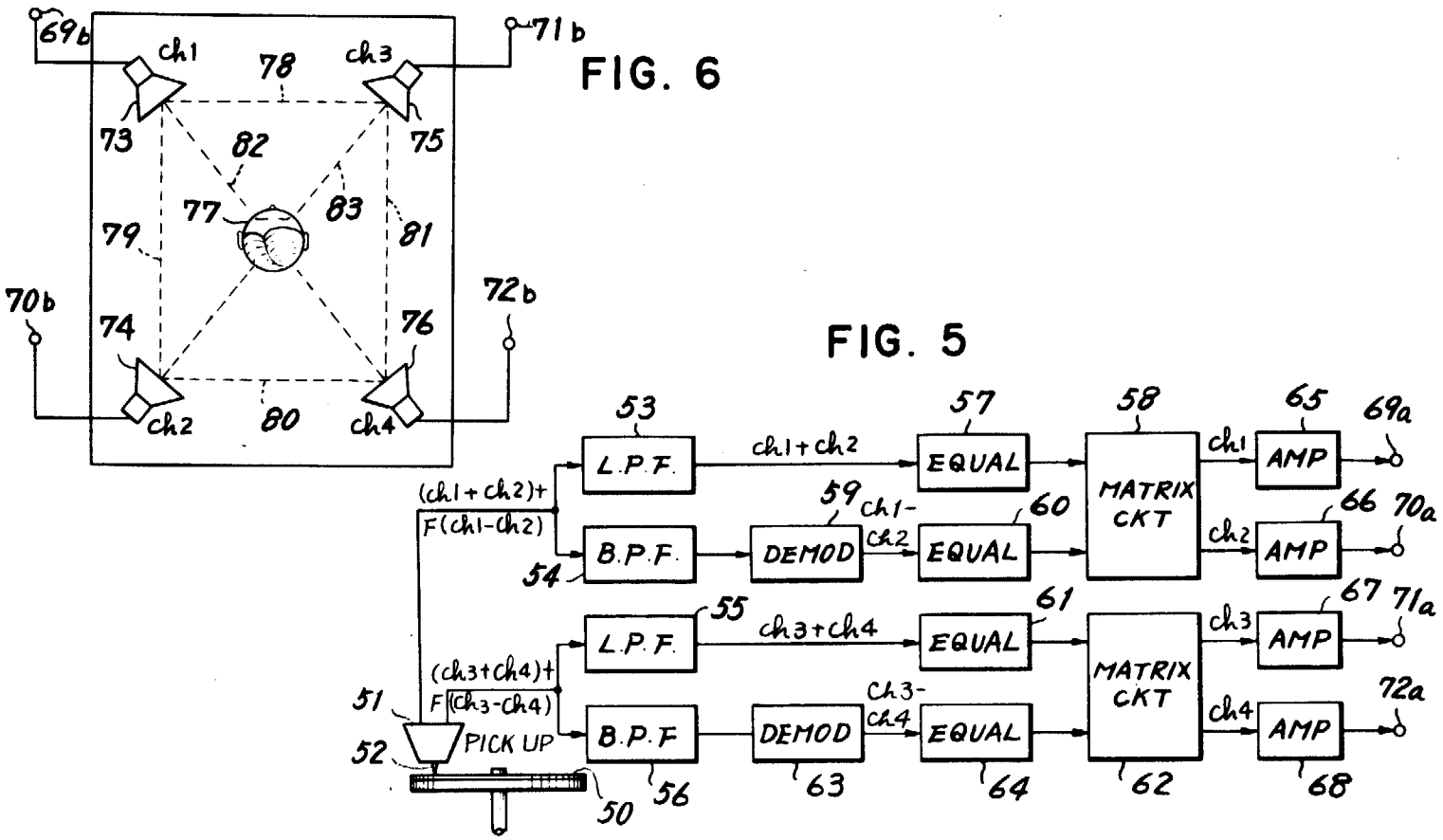
FIG. 5 is a block diagram showing one embodiment of the reproducing system according to the invention.
FIG. 6 is a diagram illustrating a reproduced sound field.

FIG. 5 is a block diagram showing one embodiment of a reproducing system, according to the invention. A record disc 50 is formed by a conventional method, using the lacquer disc 30 into which the groove has been cut and the four channel signals have been recorded as hereinabove described. The record disc 50 has a groove of the same shape as that of the lacquer disc 30. The record disc 50 is placed on a turntable of a record player and rotated at a regular rotating speed (for example [33-] *33⅓* rpm) which is S times as fast as the speed of the lacquer disc 30.

A stylus 52 of a pickup cartridge 51 contacts the groove of the record disc 50 to reproduce the recorded signals. In the present embodiment the reproducing frequency characteristic of the pickup cartridge 51 is 20Hz to 45KHz, and the stylus pressure of the cartridge is 1.5 grams. Since the record 50 is rotated at a regular rotating speed, the frequency characteristics of the signals is reproduced respectively from both walls of the groove of the record disc 50, as shown by solid lines in FIGS. 3A and 3B.

More specifically, the multiplexed signal reproduced from the left wall of the groove consists of the direct wave sum signal (Ch1+Ch2) shown by the solid line A in FIG. 3A and the angle modulated difference signals F(Ch1−Ch2) shown by the solid line B in FIG. 3A. Similarly, the multiplexed signal reproduced from the right wall of the groove consists of the direct wave sum signal (Ch3+Ch4) shown by the solid line C in FIG. 3B and the angle modulated difference signal F(Ch3−Ch4) shown by the solid line D in FIG. 3B. Upper frequency limits of the direct wave sum signals (Ch1+Ch2) and (Ch3+Ch4) are respectively approximately 15KHz. Center carrier frequencies of the angle moduated difference signals F(CH1−Ch2) and F(CH3−Ch4) are respectively 30KHz. The upper frequency limits of their frequency deviations are respectively 45KHz. The lower frequency limits thereof are respectively 20KHz. The lower limits of the frequency deviations are respectively cut by 5KHz, thereby to limit their upper limits to 45KHz.

The multiplexed signal {(Ch1+Ch2) + F(Ch1−Ch2)} reproduced from the pickup cartridge stylus 52 is supplied to a low-pass filter 53 and a band-pass filter 54. The sum signal (Ch1+Ch2) filtered through the low-pass filter 53 is supplied to a matrix circuit 58 through an equalizer 57. The angle modulated difference signal F(Ch1−Ch2) output from the band-pass filter 54 is demodulated by a demondulator 59. The demodulated signal (Ch1−Ch2) is supplied to the matrix circuit 58 through an equalizer 60. Similarly, the reproduced multiplexed signal {(Ch3+Ch4) + F(Ch3−Ch4)} is supplied to a low-pass 55 and a band-pass filter 56. The sum signal (Ch3+Ch4) filtered through the low-pass filter 55 is supplied to a matrix circuit 62 through an equalizer 61. The angle modulated difference signal F(CH3−Ch4) output from the band-pass filter 56 is demodulated by a demodulator 63. This demodulated signal (Ch3−Ch4) is supplied to the matrix circuit 62 through an equalizer 64.

The matrix circuit 58 effects the following matrix operation;

$$\tfrac{1}{2}\{(Ch1+Ch2) + (Ch1-Ch2)\} = Ch1$$

$$\tfrac{1}{2}\{(Ch1+Ch2) - (Ch1-Ch2)\} = Ch2$$

Accordingly, the first and second channel signals Ch1 and Ch2 are taken out of the matrix circuit 58. Similarly, the third and fourth channel signals Ch3 and Ch4 are separately taken out of the matrix circuit 62. The first to fourth channel signals Ch1 to Ch4 are respectively amplified at amplifiers 65, 66, 67 and 68, and then taken out of output terminals 69a, 70a, 71a and 72a as signals having frequency bands of 30Hz of 15KHz.

The first to fourth channel signals output from the terminals 69a to 72a are respectively supplied to speaker input terminals 69b, 70b, 71b and 72b, shown in FIG. 6. Speakers 73, 74, 75 and 76, for the first to fourth channel signals, reproduce the sound of the first to fourth channel signals. The speakers 73 and 74 for the first and second channels are respectively placed at the left front and the left rear of a listener 77. The speakers 75 and 76 for the third and fourth channels are respectively placed at the right front and right rear of the listener 77.

In this case, six sound planes are formed, i.e., the planes between the speakers 73 and 75, 73 and 74, 74 and 76, 75 and 76, 73 and 76, and 75 and 74 as shown respectively by broken lines 78, 79, 80, 81, 82 and 83. Accordingly, the sound source reproductivity of the system according to the invention is six times as large as the conventional two channel stereo reproducing system in which only one sound plane is formed.

If the record disc 50, constructed as hereinabove described, is played back in a conventional two channel stereo record reproducing apparatus, the angle modulated signal will be cut off. Only the direct wave signal will be reproduced. Accordingly, the sum signal of the first and second channels will be reproduced from a left speaker and the sum signal of the third and fourth channels from a right speaker. Conversely, if a conventional two channel stereo record disc is played back in the four channel record reproducing apparatus according to this invention, a left channel signal will be reproduced from the speakers 73 and 74 and a right channel signal from the speakers 75 and 76. Accordingly, the four channel record disc and the reproducing apparatus therefor according to this invention are completely compatible with the conventional two channel stereo record disc and the reproducing apparatus therefor.

Further, in the embodiment hereinabove described, the four channel signals are obtained by microphones placed as shown in FIG. 1. The signals are reproduced by speakers placed as shown in FIG. 6. In the system according to this invention, however, arrangements of the microphones and speakers are not limited to those shown in the aforementioned figures.

For example, among the microphones 11 to 14 shown in FIG. 1, the microphones 12 ad 14 may be interchanged with each other. In this case, the speakers 74 and 76 among the speakers 73 to 76 shown in FIG. 6 must of course be interchanged with each other. In addition, multiplexed signals recorded and reproduced in this case are, if placed as illustrated with reference to FIG. 6, a multiplexed signal of a sum and difference signals of channels corresponding to the left front and right rear positions of the listener 77. A multiplexed signal of a sum and difference signals of channels corresponding to the right front and left rear positions.

Furthermore, arrangements of the microphones 11 to 14 and the speakers 73 to 76 can be conveniently altered.

In multiplexing, the first and second [or third] *(or third* and fourth) channel signals Ch1 and Ch2 (Ch3 and Ch4) [and] *are* recorded on one wall of the record groove. It is easily conceivable that only the second ([only] *or* fourth) channel signal Ch2 (Ch4) [only] is frequency modulated and multiplexed with the first (third) channel signal Ch1 (Ch3). If, however, a four channel record disc is played back in the conventional two channel stereo reproducing apparatus, the second (fourth) channel signal is not reproduced at all. Accordingly, when each channel signal has a separate sound information, the reproduced sound will be extremely unnatural and incomplete. Therefore, there is no compatibility in this easily conceivable system. In the system according to this invention, a complete compatibility is assured by effecting a matrix operation.

Nextly, the second reason for effecting the aforementioned matrix operation in the system according to this invention will be explained. When a signal formed by multiplexing an angle modulated signal with a direct wave signal is transmitted, there is a signal-to-noise ratio deterioration [distortion]. *Distortion* of the demodulated carrier will generally occur, which in turn will cause disturbance and noise from the direct wave signal in the demodulated signal.

The radius of tip of a playing back stylus for contacting the record disc is practicably 5 $\mu$ at the minimum, so as not to injure the groove of the record disc. On the other hand, a half wave length of a carrier having a superaudible frequency of 30KHz is, for example, 3.5$\mu$ measured at the innermost groove having a diameter of 120mm of a 33⅓ rpm record disc. Consequently, the amplitude of the carrier should be below a certain value in order to be reproduced by the stylus having a radius of 5$\mu$. In other words, the amount of energy of the carrier for cutting on the record disc cannot exceed a certain [vlaue.] *value.* The energy of the carrier is dependent upon the frequency and amplitude of the carrier. Further, a record disc has inherent factors for generating noise due to uneven plating in its production process, material of record disc etc. Accordingly, the signal-to-noise ratio of the reproduced carrier becomes a limited value.

Further, if there is a strong high frequency component [is strong] in the direct wave signal, its influence upon the carrier cannot be ignored. The carrier is disturbed to a considerable degree by the direct wave signal.

In the system according to this invention, noise is diminished by applying the matrix operation to the channel signals. The reason therefor will be set forth hereinbelow. Noises contained in the signals recorded on and reproduced from the left and right walls of the groove are respectively designated as $L_N$ and $R_N$.

If, as described hereinabove, only the signals Ch3 and Ch4 are angle modulated and recorded and reproduced after being multiplexed with the signals Ch1 and Ch2, respectivey, each reproduced channel signals Ch1′ to Ch4′ are represented as follows;

$$Ch1' = Ch1$$

$$Ch2' = Ch2 + L_N$$

$$Ch3' = Ch3$$

$$Ch4' = Ch4 + R_N$$

On the other hand, in the system according to this invention, the difference signals (Ch1−Ch2) and (Ch3−Ch4) are angle modulated and multiplexed with the sum signals (Ch1+Ch2) and (Ch3+Ch4). Accordingly, reproduced signals are represented by (Ch1+Ch2), [(Ch2−Ch2+$L_N$),] *(Ch1−Ch2 + $L_N$),* (Ch3+Ch4) and Ch3−Ch4+$R_N$). Therefore, each reproduced signal Ch1′ to Ch4′ is represented as follows;

$$Ch1' = \{(Ch1 + Ch2) + (Ch1 - Ch2 + L_N)\} = Ch1 + L$$

$$Ch2' = \{(Ch1 + Ch2) + (Ch1 - Ch2 + L_N)\} = Ch2 - L$$

$$Ch3' = \{(Ch3 + Ch4) + (Ch3 - Ch4 + R_N)\} = Ch3 + R$$

$$Ch4' = \{(Ch3 + Ch4) + (Ch3 - Ch4 + R_N)\} = Ch4 - R$$

Accordingly, in the system according to this invention, noise is likely to occur n the [(the] second and fourth channels, where it is decreased by one-half, as compared to a system in which no matrix operation is effected. Moreover, noise components are in opposite phase between the first and second channels whereby an auditory sensitivity to the noise becomes very low.

In the noise signal $L_N$ is amplifier K times and applied to a speaker having impedance of RΩ, electric power $P_1$ applied to the speaker in the system in which no matrix operation is effected with be as follows:

$$P_1 = (KL_N)^2/R = K^2 \quad R \quad L_N 2$$

In the system according to this invention, electric power $P_2$ applied to two speakers will be as follows:

$$P_2 = K \quad L_N \quad 2\ ^2/R + K \quad +L_N \quad 2\ ^2/R = K^2 \quad R\ L_N 2$$

Accordingly, sound output of the noise component will be halved by effecting matrix operation as in the system according to this invention.

Nextly, in case two angle modulated waves are transmitted by separate transmission systems, a beat will generally be produced between the carriers of the transmitted frequency modulated signals, if there is crosstalk between the two transmission systems. Beats will also be produced between the carrier and the side band and between the side bands. Accordingly, if there is crosstalk between the L and R channel multiplexed signals on both walls of the groove in recording and reproducing on the aforementioned four channel record groove, disturbing noises will be generated by the beats. The system according to this invention, is so constructed that the four channel record will be put into practical use. The detail of this construction will be described hereinbelow.

Figure 7:
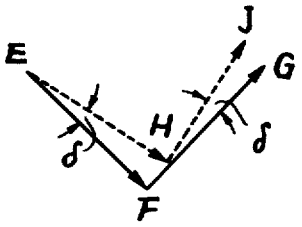
FIG. 7 is a vector diagram showing the relationship between vectors of a groove of a record disc and an actuating axis of a pickup stylus.

In FIG. 7, vectors $\overline{EF}$ and $\overline{FG}$ show movements of left and right channels of the cutter. Vector $\overline{EH}$ and $\overline{HJ}$ show sensitivity axes of left and right channels of the pickup stylus. If there is discrepancy between the cutter and the pickup stylus by an angle $\delta$, as shown in the figure, a crosstalk in the amount shown by a crosstalk ratio $C_t$, of the following equation, will be generated;

$$C_t \approx 20 \log\left(\frac{1}{\sin\delta}\right)(\text{dB})$$

where $\delta << 1$ radian. It will be understood that if the angle $\delta$ is for example 0.03 radian, the crosstalk ratio $C_t$ is about 30dB.

Further, in actual pickup operation, crosstalks will also occur due to a partial deformation of the record groove or the construction of vibration system of the pickup. Accordingly, it is difficult to confine crosstalk ratio to 20 dB or above as a whole in recording on and reproducing from the record groove of the 45—45 system.

Nextly, the reason why a disturbing noise is produced in a reproduced signal due to crosstalk will be described. This disturbing noise brings a bad effect to the reproduced sound which is different [kind] from a bad effect produced by crosstalk occurring during recording and reproducing on a 45—45 system, two channel stereo record [brings] with respect to the orientations of the left and right sound sources. As a cause for mutual interference between L and R channel signals, the beat between the carriers of both channels is the greatest one. In addition to this, there are also beats which occur between the carrier of one channel and the side band of the other channel and, though small in degree, between the side bands of the both channels.

For the sake of brevity, it is assumed that one, of separate but mutually crosstalking separate L and R channel signals, is a frequency modulated signal, and the other is a singal having a constant frequency which is the same as the carrier of the frequency modulated wave.

In case the crosstalk occurs between the separate channels, side band component of the frequency modulated wave included in the reproduced signal of each channel is affected by the crosstalk. As a result, a disturbing noise is produced in a reproduced signal obtained by demodulating the frequency modulated wave of each channel signal. This relation will now be described with reference to a vector diagram.

Figure 8:
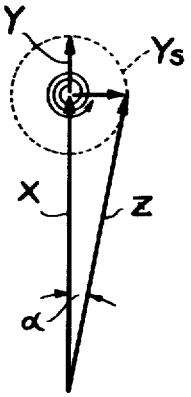
FIGS. 8 and 9 are respectively vector diagrams for illustrating a crosstalk.
Figure 10A:
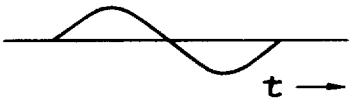
FIGS. 10A and 10B are diagrams showing signal waveforms.
Figure 10B:
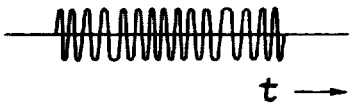

The frequency modulated wave of one channel is shown by vector Y, and the wave having the constant frequency of the other channel is shown by vector X. FIG. 8 is a vector diagram showing the composition of the vectors X and Y caused by the crosstalk. In the diagram, the arrow in a spiral form shows that the phase angle of the carrier of the frequency modulated wave is rotated by the modulating wave. The waveform of the wave represented by the vector Y is shown in FIG. [10] *10A*, and the waveform of the composite vector Z of the vectors X and Y is shown in FIG. 10B.

In FIG. 8, vector Z represents the composite vector of the vector X and the vector Y. The tip vector Z, which results from the crosstalk between the left and right channels, moves around a circle Ys as the vector Y is rotated. The deviation angle $\alpha$ between the vector X and the vector Z changes as the vector Y is rotated.

Accordingly, the variation of phase deviation in the composite wave represented by the vector. Z is different from the variation of phase deviation in an single frequency modulated wave due to presence of the deviation angle $\alpha$. Consequently, harmonics of higher orders of the modulating wave is contained in the reproduced signal which is obtained after demodulation. These harmonics generate the disturbing noises. The larger the phase deviation angle $\theta$ of the crosstalking frequency modulated wave (the rotating angle of the vector Y), the larger the amount of disturbing noise thus generated in the reproduced signal. The above description has been made on the assumption that the vector X and the vector Y have the same carrier frequency. If these vectors have different frequencies, interference noises will be generated between the carriers and between the carrier and the side band. The level of this interference noise is much higher than the aforementioned disturbing noise. Accordingly, it is an essential condition that the separate channel signals have the same carrier frequency.

Figure 12:
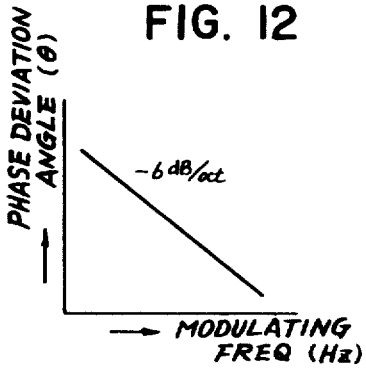
FIG. 12 is a diagram showing the relationship between the frequency of the modulating wave and the phase deviation angle.

Further, in a frequency modulated wave, modulation index mf is shown by the relation $mf = \Delta f/fm$. The maximum frequency deviation $\Delta f$ is a constant value which is independent of the modulating wave frequency fm, if the level of the modulating wave is constant. The modulation index mf is varied inversely with the modulating wave frequency fm. Accordingly, the phase deviation angle of the frequency modulated wave is in inverse proportion to the frequency of the modulating wave. The inverse proportion is expressed by the straight line of $-6$ dB/oct as shown in FIG. 12. In case the level of the modulating frequency is constant, the deviation angle will become $\frac{1}{2}$ if the modulating frequency is doubled.

Consequently, in case the frequency modulated wave in each separate channel has been frequency modulated by a modulating wave having a low frequency component, the phase deviation angle $\theta$ of the frequency modulated wave becomes large. A great deal of disturbing noise is generated in the reproduced signal due to crosstalk between the two channel signals.

It will be understood from the above description that the disturbing noise may be reduced if the phase deviation angle of the frequency modulated wave determined by the modulating wave is made small. This relation will further be considered with reference to FIG. 9.

Figure 9:
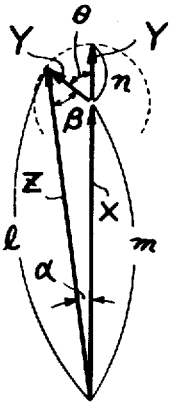

In FIG. 9, the length of vector X is designated as m, the length of vector Y as n, the length of vector Z as l the phase deviation angle of vector Y as $\theta$ and the deviation angle of vector Z as $\alpha$. Then, there is a relation $$\frac{m}{\sin\beta} = \frac{n}{\sin\alpha} = \frac{l}{\sin(\pi - \theta)} \quad (1)$$

From Equation (1), Equations $$\sin\alpha = \pm\sqrt{\frac{\sin^2\theta}{\left(\frac{m}{n} + \cos\theta\right)^2 + \sin^2\theta}} \quad (2)$$

$$l = \pm\sqrt{(m + n\cos\theta)^2 + n^2\sin^2\theta} \quad (3)$$

are obtained.

Figure 11A:
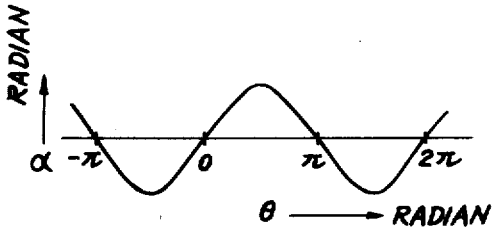
FIGS. 11A and 11B are diagrams showing, respectively, the relationships between an angle $\theta$ and an angle $\alpha$, and the angle $\theta$ and a vector l shown in FIG. 9.
Figure 11B:
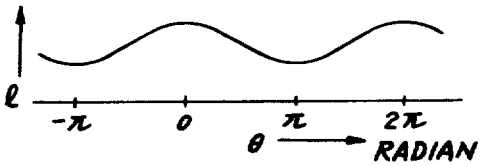

The FIG. 11A shows a relation between the phase deviation angle $\theta$ of the vector Y and the angle $\alpha$ of the vector Z obtained by the above Equations (2) and (3). FIG. 11B shows the relation between the phase deviation angle $\theta$ of the vector Y and the length l of the vector Z. In FIG. 11A, if $|\theta| < \pi/2$, then $\theta \sim \alpha$, i.e., the phase deviation angle $\theta$ will substantially be proportional to the deviation angle [$\pi$. ] $\alpha$.

As described hereinabove, within a range where the phase deviation angle $\theta$ and the deviation angle $\alpha$ are proportional, a crosstalk may occur between separate channel signals. This crosstalk will not produce a higher harmonic component of the modulating wave in the reproduced signal of the other channel. Accordingly, it will not produce a disturbing noise. The above description has been made on the assumption that the direction of the vector Y and the vector X is the same during the time when they are not modulated.

In the system according to this invention, it is intended that the same phase deviation angle $\theta$ is given to the angle modulated waves of separate channels. Crosstalk which may inevitably occur between separate channel signals will not produce a disturbing noise in the reproduced sound. The phase deviation angle $\theta$ satisfies the aforementioned relation [$\iota$] $\theta \sim \alpha$ in a standard level of the modulating wave in a frequency band ranging over several hundreds to several thousands Hz, which is relatively high in auditory sensitivity. This purpose of the invention is achieved by supplying carriers having the same frequency and phase to the frequency modulators 22 and 23 by means of the same local oscillator 24.

Figure 13:
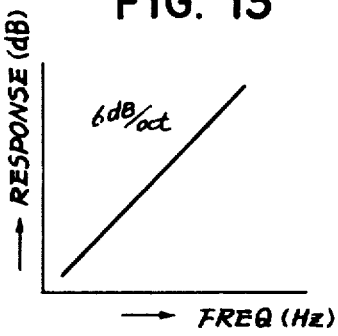
FIGS. 13 and 14 are diagrams showing respectively examples of the frequency response characteristics of equalizers used in the recording system shown in FIG. 2.
Figure 14:
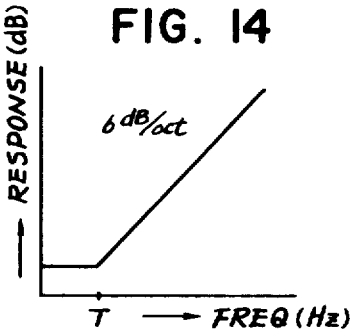

In FIG. 2, the equalizers 19 and 21 have a frequency response characteristic, as shown in FIG. 13 or FIG. 14.

In the characteristic shown in FIG. 13, the output level rises at a slope of 6 dB per octave, as the frequency increases. Accordingly, the frequency modulated waves which are obtained from the frequency modulators 22 and 24 trough the equalizers 19 and 21 are substantially phase modulated waves. The phase deviation angle of the phase modulated wave shows a constant value, which is independent from variations of the frequency if the level of the modulating wave is constant.

Thus, the phase deviation angle $\theta$ of the angle modulated wave (which is obtained at the outputs of the frequency modulators 22 and 24) is set at a predetermined radian (for example, approximately 0.3 to 3 rad.), when the level of the modulating wave applied to the frequency modulators 22 and 24 is a standard level. Then, the crosstalk which may occur will not finally produce a disturbing noise in the reproduced signal.

In the characteristic shown in FIG. 14 as another example of characteristic of the equalizers 19 and 21, the characteristic is flat within a low frequency range. Sounds which are usually recorded on a record disc scarecely contain a sound of very low frequency component. Even if there is such very low frequency component, its energy is very small. Further, the phase deviation angle of the angle modulated wave, modulated by a modulating wave having a frequency corresponding to the ultra low sound frequency range, may be large. The result is a generation of the disturbing noise in the reproduced sound. The frequency component of the disturbing noise is within a range where an auditory detecting ability is relatively low. Therefore, the signal-to-noise ratio in a low frequency range is improved by making the characteristic flat below a suitable frequency, which is shown by point T in FIG. 14.

As a frequency at the point T, a suitable frequency within the range of 100 to 2000 Hz is selected. An experiment shows that a good result is obtained when the frequency around 800 Hz is selected.

Figure 15:
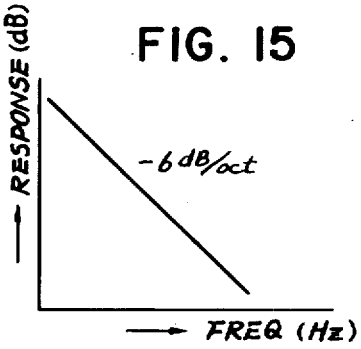
FIGS. 15 and 16 are diagrams respectively showing examples of the frequency response characteristics of equalizers used in the reproducing system shown in FIG. 5.
Figure 16:
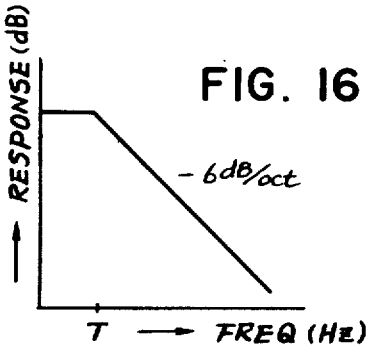

In the reproducing system shown in FIG. 5, the equalizers 60 and 64 have a frequency response characteristic shown in FIG. 15 or FIG. 16. If the equalizers 19 and 20 have the characteristic shown in FIG. 13, the equalizers 60 and 64 have the characteristic as shown in FIG. 15, which is the inverse of the characteristic shown in FIG. 13. If the equalizers 19 and 21 have the characteristic shown in FIG. 14, the equalizers 60 and 64 have the characteristic as shown in FIG. 16 which is the inverse of the characteristic shown in FIG. 14.

As described hereinabove, in the system according to this invention, the phase deviation angle of the angle modulated wave (obtained by angle modulation by a modulating wave at a reference level) is set a predetermined radian. This deviation angle is set irrespective of the modulating wave frequency, particularly in a high and intermediate frequency ranges where auditory sensitivity is high. Accordingly, no disturbing noise is produced in the reproduced signal when the composite signal containing a crosstalk component is demodulated.

In case the level of the input modulating wave exceeds the standard level, a harmonic component of higher order is developed in the reproduced signal obtained by demodulating the composite signal of the angle modulated wave and the crosstalk component. The harmonic component, of higher order [is] *in* the reproduced signal obtained by demodulation, is reduced to an accoustically undetectable level by the equalizers 60 and 64, which have characteristics for attenuating signals in high frequency range. Accordingly, even in case the level of input modulating wave exceeds the standard level, no disturbing noise is produced in the reproduced signal.

The relative speed of a pickup stylus, with respect to a recored disc, in several hundred mm/sec. The size of dust particles which may fall in the groove of the record disc is several tens $\mu$. Hence, most frequency components of noise signals generated by such dust particles are distributed within a high frequency range. Accordingly, the signal-to-noise ratio is improved by reducing the frequency characteristic of the modulated wave in a high frequency range during reproduction of the signal.

The system according to this invention is further considered from the aspect of transmission energy. A 100 percent-modulation in an amplitude modulation system corresponds to the case in which the phase deviation angle of the angle modulated wave is set at 1, radian in the system according to this invention. Accordingly, the signal-to-noise ratio is improved by about 20 dB in a high frequency range, [as] and about 40 dB in a low frequency range *as* compared with the amplitude modulation system.

In the aforementioned embodiment of the recording system, the combination of the frequency modulators 22 and 24 and the equalizers 19 and 21 is employed as a modulating means. However, the modulating means is not limited to this, but a modulator may be employed having a characteristic providing an angle modulated wave having a constant phase deviation angle relative to an input modulating wave. The deviation is at a certain level within a range above several hundred Hz.

Nextly, a specific embodiment of a frequency modulating means consisting of the frequency modulators 22 and 23 and the local oscillator 24 which are adopted in the recording system shown in FIG. 2 will be described.

Figure 17:
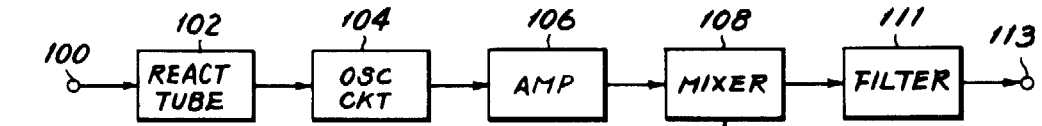
FIG. 17 is a block diagram of an easily conceivable embodiment of a frequency modulating means in the recording system.

FIG. 17 shows an example of a frequency modulating means which is readily conceivable from the conventional prior art. Difference signals (Ch1−Ch2) and (Ch3−Ch4) are respectively supplied from input terminals 100 and 101 to mixers 108 and 109 through reactance tubes 102 and 103, oscillating circuits 104 and 105, and buffer amplifiers 106 and 107. At the mixers 108 and 109, the difference signals are mixed with a signal from an oscillator 110. Outputs from the mixers 108 and 109 are taken out of output terminals 113 and 114 through filters 111 and 112.

The easily conceivable frequency modulating means of the aforementioned construction has the separate oscillating circuits 104 and 105 in the two channels. It is difficult to synchronize these two oscillating circuits 104 and 105. If, for example, there is no input at the terminal 100 and there is an input at the terminal 101, the frequency of the oscillating circuit 105 deviates in accordance with the input at the terminal 101. At the same time, the frequency of the oscillating circuit 104 is also deviated by the oscillating circuit 105 notwithstanding the absence of input at the terminal 100, which produces an undesirable result. If is, therefore, very difficult to control and synchronize this system so as to obtain carriers having the same frequency and phase from the terminals 113 and 114.

In the system according to this invention, it is necessary to have a modulator which is capable of obtaining signals of two channels having the same carrier frequency and phase, in order to preven distortion and disturbing noise due to crosstalk in each channel signal. Accordingly, the aforementioned modulating means which is easily conceivable from the prior art is of no practical use in the system according to this invention.

Figure 18:
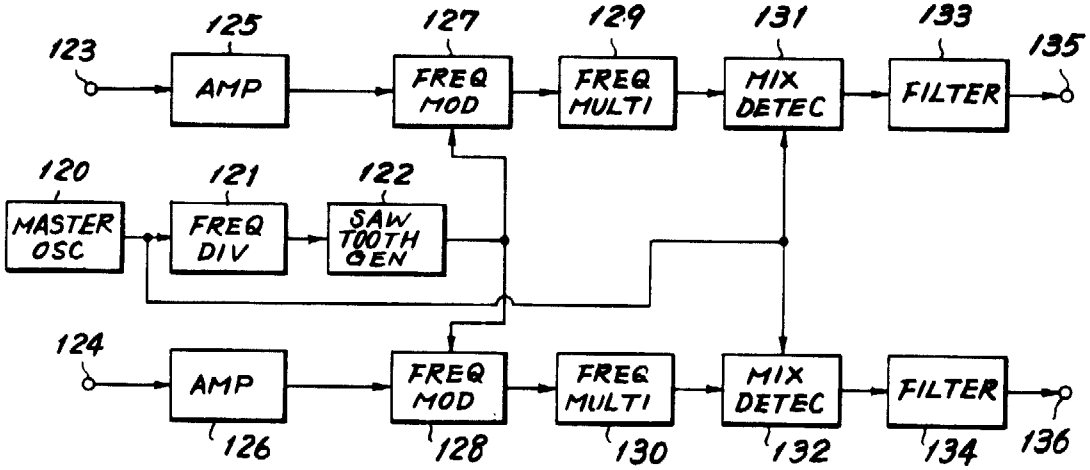
FIG. 18 is a block diagram of a preferable embodiment of the frequency modulating means in the recording system.

Then, in the system according to this invention, the frequency modulating means shown in FIG. 18 is employed as a preferable embodiment. A master oscillator 120 includes a crystal oscillator with a stable output. Output from the oscillator 120 is supplied on one hand, to a frequency divider 121 at which the frequency is divided into a frequency of q/p times. A saw tooth generator 122 generates a saw tooth wave responsive to the output of the frequency divider 121. The output of the saw tooth generator 122 is supplied as a carrier to frequency modulators 127 and 128. The frequency modulators 127 and 128 respectively consist of an equalizer having a characteristic *that* increases in a low frequency range and a phase modulator. The difference signals (Ch1−Ch2) and (Ch3−Ch4) [as] *are* applied to input terminals 123 and 124, which are respectively supplied to the modulators 127 and 128 after being amplified by amplifiers 125 and 126.

The modulators 127 and 128 are serrasoid modulators for effecting modulation without changing the phase of the carrier. It is to be noted here that, with the modulation, a carrier and a sideband which compose a frequency modulated wave are separately considered. The sideband is changed by a modulating wave and the carrier is changed only in its level. When the modulation index is large, the phase of the carrier changes by 180°. Here, the level of the carrier has changed to negative and the phase of the carrier remains unchanged.

The output frequency modulated signals, from the modulators 127 and 128, are multiplied in the frequency thereof by frequency multipliers 129 and 130. This increases the modulation degree. The resulting signal is supplied to mixing detectors 131 and 132. At the same time, the output frequency from the master oscillator 120 is supplied to the mixing detectors 131 and 132. Obtained from the mixing detectors 131 and 132 is an output signal which has been beat down to a frequency which is the difference between the output frequency from the oscillator 120 and the frequency of output signals from the frequency multipliers 129 and 130. This output signal is taken out of output terminals 135 and 136 through filters 133 and 134.

According to the frequency modulator means of the aforementioned construction, the signals which actuate the modulators 127 and 128 and the signals which are supplied to the mixing detectors 131 and 132 are all maintained at the same frequency and in the same phase. Accordingly, it is possible to transmit the angle modulated wave without producing disturbing noises due to crosstalk, even in transmission systems in which crosstalk occurs between the L and R channels.

The modulation angle obtained from the serrasoid modulators 127 and 128 is on the order of ±1.5 radian. It is theoretically impossible to obtain a modulation angle of more than ±3 radian. Accordingly, a greater modulation angle is obtained by increasing the modulation degree by means of the frequency multipliers 129 and 130.

If it is desired to obtain carriers of the output frequency modulated signals from the terminals 135 and 136 at a low frequency, the signals must be beat down after being multiplied by the frequency multipliers 129 and 130. This will be understood from the fact that the frequency of the saw tooth wave at the serrasoid modulators must be selected at a frequency at least five times as high as a maximum modulating frequency in order to avoid the beats which will otherwise occur between the saw tooth wave and the modulating wave if the saw tooth is selected at a low frequency.

If an oscillator has an unstable output frequency and its output has already been modulated by noises such as hum, instead of the stable master oscillator 120 which supply the signal to the mixing detectors 131 and 132, the signal-to-noise ratio will extremely be deteriorated. In this case, the signal-to-noise ratio will be deteriorated in proportion to the multiplication of the frequency multiplier. If, for example, the frequency is multiplied 81-times, the signal-to-noise ratio will be deteriorated by a factor of 81.

In the system according to this invention, the output of the master oscillator 120 is multiplied after being frequency divided and frequency modulated. This multiplied output is beat down with the output from the master oscillator 120. As a result, the variation in the output of the master oscillator 120 is mostly cancelled by being beat down. Accordingly, even if the output of the master oscillator 120 is modulated in AC, there is not much variation in the beat down output and hence no deterioration in the signal-to-noise ratio.

This invention is not limited to the embodiments hereinabove described but many modifications and variations may be made without departing from the spirit and scope of the invention.

What I claim is:

1. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians *for at least those frequencies which are higher than a predetermined frequency when the level of each of said difference signals applied respectively to said two modulator means is a standard level,* the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

2. A system for reproducing the four channel signals recorded by the apparatus of the system of claim 1, said reproducing system comprising first separator means for separating the first sum signal and the angle modulated signal which is modulated with the first difference signal, said first sum signal and the angle modulated signal being electrical signals generated in response to the signals recorded on the one wall of the groove of the record disc, second separator means for separating the second sum signal and the angle modulated signal which is modulated with the second difference signal, said second sum signal and the angle modulated signal being electrical signals generated in response to the signals recorded on the other wall of the groove of the record disc, first demodulator means for demodulating the angle modulated signal separated by the first separator means and thus reproducing the first difference signal, second demodulator means for demodulating the angle modulated signal separated by the second separator means and thus reproducing the second difference signal, second matrix circuit means responsive to the separated first sum signal and the reproduced first difference signal for separately reproducing the original first and second channel signals, and third matrix circuit means responsive to the separated second sum signal *and the reproduced second difference signal* for separately reproducing the original third and fourth channel signals.

3. A system for reproducing the four channel signals recorded by the apparatus of the system according to claim 1, said reproducing system comprising pickup means for picking up a composite signal responsive to different signals recorded on the two sidewalls of a record groove, first separator means for separating the first sum signal and the angle modulated signal which is modulated with the first difference signal, said first sum signal and the angle modulated signal being electrical signals generated by the pickup means in response to the signals recorded on the one wall of the groove of the record disc, second separator means for separating the second sum signal and the angle modulated signal which is modulated with the second difference signal, said second sum signal and the angle modulated signal being electrical signals generated by the pickup means in response to the signals recorded on the other wall of the groove of the record disc, first demodulator means for demodulating the angle modulated signal separated by the first separator means and thus reproducing the first difference signal, second demodulator means for demodulating the angle modulated signal separated by the second separator means and thus reproducing the second difference signal, second matrix circuit means responsive to the separated first sum signal and the reproduced first difference signal for separately reproducing the original first and second channel signals, and third matrix circuit means responsive to the separated second sum signal and the reproduced second difference signal for separately reproducing the original third and fourth channel signals.

4. A system for reproducing the four channel signals recorded by the apparatus of the system of claim 1, said reproducing system comprising pickup means for generating first electrical signals responsive to the signals recorded on the one wall of the groove and other electrical signals responsive to the signals recorded on the other wall of the groove, first separator means for separating the first sum signal and the angle modulated signal which is modulated with the first difference signal, second separator means for separating the second sum signal and the angle modulated signal which is modulated with the second difference signal, first demodulator means for demodulating the angle modulated signal separated by the first separator means and thus reproducing the first difference signal, second demodulator means for demodulating the angle modulated signal separated by the second separator means and thus reproducing the second difference signal, second matrix circuit means responsive to the separated first sum signal and the reproduced first difference signal for separately reproducing the original first and second channel signals, third matrix circuit means responsive to the separated second sum signal and the reproduced second difference signal for separately reproducing the original third and fourth channel signals, and means comprising four speakers for individually generating sound respectively responsive to the four reproduced channel signals.

5. The reproducing system as defined in claim 4, wherein said four speakers are arranged with respect to the listener so that the first speaker is placed at the front and on one side, the second speaker at the rear and on the one side, the third speaker at the front and on the other side, and the fourth speaker at the rear and on the other side.

6. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians for frequencies which are included in the four channel signals, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

7. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians for frequencies in at least the vicinity of or more than 800 Hz of the difference signals, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer mean on one wall of a single groove of the record disc and recording the output signal of said second mixer means on the other wall of the groove.

8. A system for recording four channel signals on a record disc, said system comprising a signal source means for supplying four separate channel signals, matrix circuit means for composing a first sum signal and a first difference signal responsive to the first and second channel signals and a second sum signal and a second difference signal responsive to the third and fourth channel signals among the four separate channel signals, single oscillator means for oscillating to provide a signal having a predetermined frequency, frequency divider means operated responsive to the oscillator signal of predetermined frequency for dividing the frequency thereof, means responsive to the output of the frequency divider means for generating a saw-tooth waveform signal, first serrasoid modulator means for angle-modulating said saw-tooth waveform signal with the first difference signal, second serrasoid modulator means for angle-modulating said saw-tooth waveform signal with the second difference signal, first frequency multiplier means for multiplying the frequency of the output signal of the first serrasoid modulator means, second frequency multiplier means for multiplying the frequency of the output signal of the second serrasoid modulator means, first mixer means responsive to the output signal of the first frequency multiplier means and the output signal of the single oscillator means for producing a signal having frequencies equal to the difference between the frequencies of the output signal of the first frequency multiplier means and the predetermined frequency of the single oscillator means, second mixer means responsive to the output signal of the second frequency multiplier means and the output signal of the single oscillator means for producing a signal having frequencies equal to the difference between the frequencies of the output signal of the second frequency multiplier means and the predetermined frequency of the single oscillator means, means whereby the carrier frequencies of the output signals of said first and second mixer means have frequencies in a recordable frequency range of the record disc, the lower frequency limit of said carrier wave being higher than the upper frequency limit of the first and second sum signals, third mixer means for mixing and multiplexing the first sum signal with the output signal of the first mixer means, fourth mixer means for mixing and multiplexing the second sum signal with the output signal of the second mixer means, and means for simultaneously recording the output signal of the third mixer means on one wall of a single groove of the record disc and the output signal of the fourth mixer means on the other wall of the groove.

9. The system of claim 8 wherein the phase angle deviation of the carrier wave of each of the output signals of said first and second mixer means is between 0.3 and 3 radians.

10. A system for recording four channel signals on a record disc, said system comprising signal source means for supplying four separate channel signals, matrix circuit means for composing a first sum signal and a first difference signal responsive to the first and second channel signals and a second sum signal and a second difference signal responsive to the third and fourth channel signals among the four separate channel signals, first equalizer means for receiving the first difference signal, second equalizer means for receiving the second difference signal, said first and second equalizer means having a characteristic frequency response which increases in proportion to an increase of frequency at a slope of 6 dB/octave, single oscillator means for generating a carrier wave having a predetermined frequency, first modulator means for frequency modulating said carrier wave responsive to the output signal of the first equalizer means, second modulator means for frequency modulating said carrier wave responsive to the output signal of the second equalizer means, the phase angle deviation of the modulated carrier wave being between 0.3 and 3 radians in each output of said first and second modulator means, and the lower frequency limit of said modulated carrier wave being higher than the upper frequency limit of said first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and the output signal of said second mixer means on the other wall of the groove.

11. A system for reproducing the four channel signals recorded by the system of claim 10, said reproducing system comprising first separator means for separating the first sum signal and the frequency modulated signal which is modulated with the first difference signal, said first sum signal and the angle modulated signal being electrical signals generated in response to the signals recorded on the one wall of the groove of the record disc, second separator means for separating the second sum signal and the frequency modulated signal which is modulated with the second difference signal, said second sum signal and the angle modulated signal being electrical signals generated in response to the signals recorded on the other wall of the groove of the record disc, first demodulator means for demodulating the frequency modulated signal separated by the first separator means and thus reproducing the first difference signal, second demodulator means for demodulating the frequency modulated signal separated by the second separator means and thus reproducing the second difference signal, first equalizer means for receiving the demodulated first difference signal, second equalizer means receiving the demodulated second difference signal, said first and second equalizer means having a characteristic frequency response which decreases in proportion to an increase of frequency at a slope of 6 dB/octave, second matrix circuit means responsive to the separated first sum signal and the output signal of the first equalizer means for separately reproducing the original first and second channel signals, and third matrix circuit means responsive to the separated second sum signal and the output signal of the second equalizer means for separately reproducing the original third and fourth channel signals.

12. The reproducing system as defined in claim 11 wherein said first and second equalizer means have a falling slope frequency characteristic of 6 dB/octave in a frequency range which is higher than a predetermined frequency and a flat characteristic in a frequency range which is lower than said predetermined frequency.

13. The reproducing system as defined in claim 12 wherein said predetermined frequency is a selected certain frequency within a range of 100 to 2,000 Hz.

14. An apparatus for recording four channel signals in a single groove cut on a record disc, said apparatus comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

15. A system for recording four channel signals in a single groove cut on a record disc, said system comprising signal souce means for supplying four separate channel signals, matrix circuit means for [comprising] *composing* a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians for frequencies which are higher than a predetermined frequency when the level of each of said difference signals applied respectively to said two modulator means is a standard level, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

16. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians for frequencies which are higher than a predetermined frequency when the level of each of said difference signals applied respectively to said two modulator means is a standard level, said predetermined frequency lying in the difference signals and being a frequency selected within a range extending from 100 to 2,000 Hz, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

17. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians for frequencies which are higher than a predetermined frequency when the level of each of said difference signals applied respectively to said two modulator means is a standard level, said predetermined frequency being a frequency in the difference signals and in the vicinity of 800 Hz, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

18. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulator means comprising means whereby the phase angle deviation of said carrier wave is between 0.3 and 3 radians for the first and second difference signals at a standard level, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

19. A system for recording four channel signals in a single groove cut on a record disc, said system comprising signal source means for supplying four separate channel signals, matrix circuit means for composing a first sum signal and a first difference signal responsive to the first and second channel signals and also a second sum signal and a second difference signal responsive to the third and fourth channel signals of the four separate channel signals, single oscillator means for generating a carrier wave having a predetermined frequency, first modulator means for angle modulating said carrier wave with the first difference signal, second modulator means for angle modulating said carrier wave with the second difference signal, each of said modulation means comprising means whereby the phase angle deviation of said carrier wave is between 0.3 and 3 radians for the first and second difference signals at a standard level and for frequencies higher than a predetermined frequency, the lower frequency limit of the carrier wave in the output of each of said modulator means being higher than the upper frequency limit of the first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and recording the output signal of said second mixer means on the other wall of the groove.

20. A system for recording four channel signals on a record disc, said system comprising signal source means for supplying four separate channel signals, matrix circuit means for composing a first sum signal and a first difference signal responsive to first and second of said four channel signals and a second sum signal and a second difference signal responsive to third and fourth of said four channel signals, first equalizer means for receiving the first difference signal, second equalizer means for receiving the second difference signal, said first and second equalizer means having a characteristic frequency responsive including at least a slope portion of 6 dB/octave, single oscillator means for generating a carrier wave having a prescribed frequency, first modulator means for angle modulating said carrier wave responsive to the output signal of the first equalizer means, second modulator means for angle modulating said carrier wave responsive to the output signal of the second equalizer means, the lower frequency limit of said modulated carrier wave being higher than the upper frequency limit of said first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and the output signal of said second mixer means on the other wall of the groove.

21. A system for reproducing the four channel signals recorded by the system of claim 20, said reproducing system comprising first separator means for separating the first sum signal and the angle modulated signal which is modulated with the first difference signal, said first sum signal and the associated angle modulated signal being electrical signals generated in response to the signals recorded on the one wall of the groove of the record disc, second separator means for separating the second sum signal and the angle modulated signal which is modulated with the second difference signal, said second sum signal and the associated angle modulated signal being electrical signals generated in response to the signals recorded on the other wall of the groove of the record disc, first demodulator means for demodulating the angle modulated signal separated by the first separator means and thus reproducing the first difference signal, second demodulator means for demodulating the angle modulated signal separated by the second separator means and thus reproducing the second difference signal, third equalizer means for receiving the demodulated first difference signal, fourth equalizer means receiving the demodulated second difference signal, said third and fourth equalizer means having a characteristic frequency response including at least a slope portion of 6 dB/octave, said slope portion of the characteristic of the third and fourth equalizer means having a reverse slope with respect to the slope of the slope portion of the characteristic of the first and the second equalizer means in the recording system, and second matrix circuit means for separately reproducing the original first and second channel signals responsive to the separated first sum signal and the output signal of the third equalizer means and also the original third and fourth channel signals responsive to the separated second sum signal and the output signal of the fourth equalizer means.

22. A system for recording four channel signals on a record disc, said system comprising signal source means for supplying four separate channel signals, matrix circuit means for composing a first sum signal and a first difference signal responsive to first and second of said four channel signals and a second sum signal and a second difference signal responsive to third and fourth of said four channel signals, first equalizer means for receiving the first difference signal, second equalizer means for receiving the second difference signal, each of said equalizer means having a characteristic frequency response including at least a flat portion for frequencies lower than a predetermined frequency and a slope portion of 6 dB/octave for frequencies higher than said predetermined frequency, single oscillator means for generating a carrier wave having a prescribed frequency, first modulator means for angle modulating said carrier wave responsive to the output signal of the first equalizer means, second modulator means for angle [demodulating] *modulating* said carrier wave responsive to the output signal of the second equalizer means, the lower frequency limit of said modulated carrier wave being higher than the upper frequency limit of said first and second sum signals, first mixer means for mixing and multiplexing the first sum signal with the output signal of the first modulator means, second mixer means for mixing and multiplexing the second sum signal with the output signal of the second modulator means, and means for simultaneously recording the output signal of said first mixer means on one wall of a single groove of the record disc and the output signal of said second mixer means on the other wall of the groove.

23. A system for reproducing the four channel signals recorded by the system of claim 22, said reproducing system comprising first separator means for separating the first sum signal and the associated angle modulated signal which is modulated with the first difference signal, said first sum signal and the associated angle modulated signal being electrical signals generated in response to the signals recorded on the one wall of the groove of the record disc, second separator means for separating the second sum signal and the associated angle modulated signal which is modulated with the second difference signal, said second sum signal and the angle modulated signal being electrical signals generated in response to the signals recorded on the other wall of the groove of the record disc, first demodulator means for demodulating the angle modulated signal separated by the first separator means and thus reproducing the first difference signal, second demodulator means for demodulating the angle modulated signal separated by the second separator means and thus reproducing the second difference signal, third equalizer means for receiving the demodulated first difference signal, fourth equalizer means for receiving the demodulated second difference signal, said third and fourth equalizer means having a characteristic frequency response including at least a flat portion for frequencies lower than the predetermined frequency and a slope portion of 6 dB/octave for frequencies higher than said predetermined frequency, said slope portion of the characteristic of the third and fourth equalizer means having a reverse slope to the slope of the slope portion of the characteristic of the first and the second equalizer means in the recording system, and second matrix circuit means for separately reproducing the original first and second channel signals responsive to the separated first sum signal and the output signal of the third equalizer means and also the original third and fourth channel signals responsive to the separated second sum signal and the output signal of the fourth equalizer means.

24. A system for recording four channel signals on a record disc, said system comprising signal source means for supplying four separate channel signals, matrix circuit means for composing a first sum signal and a first difference signal responsive to first and second of said [fourth] *four* channel signals and a second sum signal and a second difference signal responsive to third and fourth of said four channel signals, first equalizer means for receiving the first difference signal, second equalizer means for receiving the second difference signal, each of said equalizer means having a characteristic frequency response including at least a flat portion for frequencies lower than a predetermined frequency and an increasing slope portion of 6 dB/octave which increases in proportion to an increase of frequency higher than said predetermined frequency, [and each of said modulator means being a frequency modulator,] single oscillitor means for generating a carrier wave having a predescribed frequency, first modulator means for angle modulating said carrier wave responsive to the output signal of the first equalizer means, second modulator means for angle modulating said carrier wave responsive to the output signal of the second equalizer means, *each of said modulator means being a frequency modulator,* the lower frequency limit of said modulated carrier wave being higher than the upper frequency limit of said first and second sum signals, first mixer means for mixing and multiplexing the first sum signal with the output signal of the first modulator means, second mixer for mixing and multiplexing the second sum signal with the output signal of the second modulator means, and means for simultaneously recording the output signal of said first mixer means on one wall of a single groove of the record disc and the output signal of said second mixer means on the other wall of the groove.

25. A system for reproducing four channel signals which are recorded on a record disc in such a manner that a first sum signal is multiplexed with a first difference signal angle modulated on a carrier wave responsive to a first and a second channel signal of the four channel signals, said multiplexed signal being recorded on one wall of a single groove of the record disc and a second sum signal is multiplexed with a second difference signal angle modulated on a carrier wave responsive to a third and a fourth channel signal of the four channel signals, said second named multiplexed signal being recorded on the other wall of the groove, the phase angle deviation of the carrier wave in each of the first and second angle modulated difference signals being between 0.3 and 3 radians, the lower frequency limit of the carrier wave of the first and second angle modulated difference signals being higher than the upper frequency limit of the first and second sum signals, said system comprising first separator means for separating the first named multiplexed signal including the first difference signal angle modulated on the carrier wave picked up from the one wall of the groove of the record disc into the first sum signal and the first angle modulated difference signal, second separator means for separating the second named multiplexed signal including the second difference signal angle modulated on the carrier wave picked up from the other wall of the groove of the record disc into the second sum signal and the second angle modulated difference signal, first demodulator means for demodulating the 0.3 to 3 radian phase angle deviations of the carrier wave bearing the first angle modulated difference signal separated by the first separator means and thus reproducing the first difference signal, second demodulator means for demodulating the 0.3 to 3 radian phase angle deviations of the carrier wave bearing the second angle modulated difference signal separated by the second separator means and thus reproducing the second difference signal, first matrix circuit means responsive to the separated first sum signal and the demodulated first difference signal for separately reproducing the original first and second channel signals, and second matrix circuit means responsive to the separated second sum signal and the demodulated second difference signal for separately reproducing the original third and fourth channel signals.

26. An apparatus for reproducing four channel signals which are recorded on a record disc in such a manner that a first sum signal is multiplexed with a first difference signal angle modulated on a carrier wave responsive to a first and a second channel signal of the four channel signals, said multiplex signal being recorded on one wall of a single groove of the record disc and a second sum signal is multiplexed with a second difference signal angle modulated on a carrier wave responsive to a third and a fourth channel signal of the four channel signals, said second named multiplexed signal being recorded on the other wall of the groove, the phase angle deviation of the carrier wave in each of the first and second angle modulated difference signals being between 0.3 and 3 radians *for at least those freqencies which are higher than a predetermined frequency when the level of each of said difference signals applied respectively to said two modulator means is a standard level,* the lower frequency limit of the carrier wave of the first and second angle modulated difference signals being higher than the upper frequency limit of the first and second sum signals, said apparatus comprising first separator means for separating the first named multiplexed signal including the first difference signal angle modulated on the carrier wave picked up from the one wall of the groove of the record disc into the first sum signal and the first angle modulated difference signal, second separator means for separating the second named multiplexed signal including the second difference signal angle modulated on the carrier wave picked up from the other wall of the groove of the record disc into the second sum signal and the second angle modulated difference signal, first demodulator means for demodulating the 0.3 to 3 radian phase angle deviations of the carrier wave bearing the first angle modulated difference signal separated by the first separator means and thus reproducing the first difference signal, second demodulator means for demodulating the 0.3 to 3 radian phase angle deviations of the carrier wave bearing the second angle modulated difference signal separated by the second separator means and thus reproducing the second difference signal, first matrix circuit means responsive to the separated first sum signal and the demodulated first difference signal for separately reproducing the original first and second channel signals, and second matrix circuit means responsive to the separated second sum signal and the demodulated second difference signal for separately reproducing the original third and fourth channel signals.

* * * * *